United States Patent [19]

Khorkova et al.

[11] Patent Number: 4,756,913
[45] Date of Patent: Jul. 12, 1988

[54] SOUR MILK PRODUCT

[76] Inventors: Evgenia A. Khorkova, ulitsa Generala Glagoleva, d. 25, korpus 2, kv.26; Vera F. Semenikhina, ulitsa Ostrovityanova d. 24, korpus 1, kv. 13; Lilia N. Ivanova, ulitsa Khadynskaya, d, 12, kv. 37; Marina B. Sukdukova, ulitsa Serpukhovsky val, d. 14, kv. 139; Kaleria S. Ladodo, Kotelnicheskaya naberezhnaya, d. 33, kv.17; Natalya N. Semenova, ulitsa Bolshava Pirogovskaya, d. 5, kv. 44; Svetlana M. Barashneva, ulitsa 3-ya Frunzenskaya, d. 6, kv. 106, all of Moscow, U.S.S.R.

[21] Appl. No.: 43,453

[22] Filed: Apr. 28, 1987

Related U.S. Application Data

[63] Continuation-in-part of Ser. No. 783,949, Sep. 30, 1985, abandoned.

[51] Int. Cl.⁴ .................... A23C 9/13; A23C 11/02
[52] U.S. Cl. ........................... 426/61; 426/73; 426/74; 426/583; 426/801; 426/657; 426/658
[58] Field of Search ............... 426/61, 43, 42, 34, 426/583, 801, 72, 73, 74, 585, 590, 658, 657, 656

[56] References Cited

U.S. PATENT DOCUMENTS 4,216,236  8/1980  Müeller et al. ................ 426/801

FOREIGN PATENT DOCUMENTS 2489098  3/1982  France ..................... 426/43
0686711  9/1979  U.S.S.R. ................. 426/801
0990168  1/1983  U.S.S.R. ................. 426/801

OTHER PUBLICATIONS

Milk Science Int'l, Sep. 1968, Heft 9, vol. 23, pp. 554–558, Hans Carl, Publ., Nurnberg, FRG, R. Schuler-Malyoth, et al.
"New Food Industry", vol. 20, No. 8, Publ., 1978; Mudai Katakhiko.
"Characteristics of the 'Marumiru' Sour Mil Product Using the 'Bifidis' Microorganisms", pp. 17–23.

Primary Examiner—Raymond N. Jones
Assistant Examiner—Marianne M. Cintins
Attorney, Agent, or Firm—Lilling and Greenspan

[57] ABSTRACT

A sour milk product is composed of proteins, milk and vegetable fats, lactose, dextrin maltose, saccharose, water, bifidobacteria, ferrous sulphate and vitamins, A, $D_2$, E, C, $B_1$, $B_2$, $B_3$, $B_6$, $B_c$ and PP with the following proportion of ingredients, in mass per cent:

milk fat: 2.5–2.7
vegetable fat: 0.8–1.0
lactose: 2.0–2.2
dextrin maltose: 1.6–1.8
saccharose: 3.3–3.5
ferrous sulphate: 0.00325–0.00335
vitamins: 0.0064–0.0066
proteins: 1.6–1.8
bifidobacteria (ml): $10^8$–$10^9$
water: the balance.

2 Claims, No Drawings

SOUR MILK PRODUCT

REFERENCE TO RELATED APPLICATIONS

This application is a continuation-in-part of application Ser. No. 783,949 filed Sept. 30, 1985, now abandoned.

FIELD OF THE INVENTION

This invention relates to a sour milk product.

The product can be used as infant therapy diet during bottle-feeding or breast-feeding of infants in their early life. The products of this kind have to meet a number of requirements. More particularly, such products must be similar in composition to human milk to posses high nutritive and biological properties and be highly efficient for the treatment of dysbacteriosis, intestinal infections and curing after-effects of antibiotic therapy.

BACKGROUND OF THE INVENTION

It is known that bifidobacteria are an integral part of the intestinal microflora of a healthy breast-feeding infant, their content in the intestinal microflora normally amounting to between 95 and 98%.

These bacteria serve to protect infants' bodies from various infections.

A disbalance in an infant's intestinal microflora due to lack of human milk, dysbacteriosis, antibiotic therapy or intestinal infection results in a sudden decrease in the number of bifidobacteria conductive to pathogenesis of prolonged disfunctions and metabolical failures and very often causes severe chronical diseases in children.

Therefore, the problem of intestinal dysbacteriosis due to a disbalanced bifidoflora is a concern of general biological science.

It is known that disturbed intestinal microbiocenosis can be balanced by introducing medicinal preparations containing viable cells of bifidobacteria.

However, breast-feeding infants must preferably receive live cells of bifidobacteria with food, that is with milk food which contains large amounts of such bacteria.

There is known a sour milk product containing bifidobacteria and fabricated from whole cow's milk.

Ferments used for making this product include thermophilic streptococcus, acidophilic bacilla and bifidobacteria in the ratio 5:1:1 (Milchwissenschaft; J.29, H.9, 1968, BDR: Schuler-Maluoth R., Ruppert A., Müller Fr. "Die Mikroorganismen der Bifidusgruppe." 2. Mitteilung. Die Technologie der Bifidokultur im verarbeitenden Betrieb., s. 554–558).

However, despite the fact that the product contains bifidobacteria, it cannot be consumed by infants of breast-feeding age, since none of the ingredients approximates the composition of female human milk.

There is also known a sour milk product in which use is made of only pure cultures of bifidobacteria. Its composition is as follows, in mass per cent: protein - 3.3, milk fat - 3.3, milk sugar - 4.8, mineral substances - 0.8, vitamin A - more than 138 I.U.

This product is prepared from whole dry milk and water. The dry milk gives protein, fat and calcium. Carrot juice is added to provide vitamin A.

After 10 days of storage at a temperature of about 10° C. the population of bifidobacteria amounts to over 5 billion live cells in a sample of 100 ml, or $5 \cdot 10^7/1$ ml. The product has found a widespread use and is intended primarily for feeding children from 1 year to pre-school age.

The content of the live cells of bifidobacteria makes the product useful for the treatment and preventive therapy of gastrointestinal troubles, restoration of disturbed balance in the intestinal microflora, metabolism improvement, etc. (cf. "New Food Industry" vol. 20, No. 8, published 1978; Mudai Katakhiko "Characteristics of the "Marumiru" Sour Milk Product Using the "Bifidis" Microorganisms", pp. 17–23.)

However, the above sour milk product cannot be used for feeding newborn and premature babies, or infants of less than two months after birth; it is definitely inapplicable to children with intestinal microflora trouble, since the product is prepared from whole milk (protein mass content - 3.3%; whereas protein mass content in female human milk is 1.1 to 1.7%). It is common knowledge that cow's milk protein is less digestible due to the underdeveloped fermentation system of the digestive tract in infants of breast-feeding age.

It addition, the sour milk product is prepared from dry milk, the dry sour milk products being known to have less nutritional value than liquid or natural products.

SUMMARY OF THE INVENTION

The present invention is therefore directed towards the provision of a sour milk product for consumption by infants, as well as by premature and newborn babies, in other words a product approximating in composition female human milk and containing a sufficiently large amount of bifidobacteria to ensure high therapeutic properties.

The aim of the invention is attained by a sour milk product composed of proteins, milk fat, milk sugar, mineral substances, vitamin A, bifidobacteria and water. The product, according to the invention, additionally includes dextrin maltose, saccharose, vegetable fat, vitamins $D_2$, E, C, $B_1$, $B_2$, $B_3$, $B_6$, $B_c$, PP, and the mineral substance is ferrous sulphate. The relationship between the components being is follows, in mass per cent:

milk fat: 2.5–2.7
vegetable fat: 0.8–1.0
milk sugar: 2.0–2.2
dextrin maltose: 1.6–1.8
saccharose: 3.3–3.5
ferrous sulphate: 0.00325–0.00335
vitamins: 0.0064–0.0066
proteins: 1.6–1.8
bifidobacteria (ml): $10^8$–$10^9$
water: the balance.

It is evident that cow's milk must be used as a base for making the proposed product. It is also known that cow's milk contains three times as much protein as female human milk. Therefore, protein content in such products must first be reduced to between 1.5 and 1.9% without affecting their properties. For this purpose, water in the amount of 40.5% is added to the mixture, whereby the protein content is brought down to 1.6–1.8 g per 100 ml or from 1.6 to 1.8% of the total.

Fat accounts for 3.3 to 3.5% of the total both for cow's milk and female human milk. However, cow's milk fat is digested by premature babies and newborns less easily than woman's milk. Such a difference in digestibility is associated with the composition of fatty acids among which the linoleic acid influencing the child's skin and weight gain plays a major role. Because cow's milk contains one fifth of the linoleic acid contained in human milk, this deficiency in the linoleic acid is compensated for by vegetable fats when producing milk mixtures for infants.

Cow's milk and human milk also vary in terms of carbohydrate content, mostly milk sugar or lactose.

Woman's milk contains 7% of lactose, whereas cow's milk contains only 4.7%. Carbohydrate content in the product is optimized by adding saccharose and malt extract (dextrin maltose).

Saccharose is added to decrease the fermentative properties of lactose, whereas dextrin maltose promotes the growth of bifidobacteria (bifidogenic effect). The ratio between proteins, fats and hydrocarbons in the diet of breast-feeding infants is 1:2:5 or 1:2:4, respectively.

It has been found that newborn babies tend to consume at a very fast rate the build-up of iron received from the mother at the fetal stage of development, whereby in the period between the age of three and nine or even ten months iron deficiency becomes very pronounced.

The proposed sour milk product contains ferrous sulphate (viz., bivalent, more biologically assimilated by the body) in an amount sufficient for optimizing iron concentration in breast-feeding infants.

Although cow's milk is a very valuable source of vitamins, milk treatment and milk product storage tend to reduce vitamin content. Milk products intended for infants are therefore vitaminized in terms of every type of vitamin, since newborns cannot compensate for vitamin deficiency by consuming meat, vegetable or other food.

Fat-soluble vitamins A, $D_2$ and E are mixed with a vegetable oil, whereas water-soluble vitamins C, PP, $B_1$, $B_2$, $B_3$, $B_6$ and $B_c$ are dissolved in water or milk to be thereafter added to the mixture. The amount of vitamins to be added is determined by the average daily infant body needs and the overall amount of vitamins consumed by children up to two months of age.

When the milk product contains less than $10^8$ of bifidobacteria in 1 ml of such product, the advantageous effect from its use is considerably reduced. The composition of the product provides conditions for the growth of bifidoflora to $10^8$–$10^9$ ml.

It is recommended that corn, coconut, sunflowerseed or olive oils are used as the vegetable fat.

The proposed sour milk product approximates in its composition human milk, and therefore it can be used for feeding babies during the after-birth period, as well as for feeding premature and newborn children. In addition, thanks to a high content of live bifidobacteria cells of $10^8$ to $10^9$ in 1 ml of the product, it can be used as an efficient diet for children suffering from dysbacteriosis or intestinal infection.

The sour milk product according to the invention was prescribed by infant clinics to premature infants and children between the age of one and four months suffering from intestinal infection of vague etiology.

The product was introduced to the premature children diet gradually to eventually replace the basic food. The product was fed both to "relatively healthy" premature newborns and children with dysbacteriosis treated by vigorous antibiotic therapy. The prematures consumed the product readily and gained in weight without any side effects.

A daily three-meals diet of the product was prescribed to children suffering from intestinal infection for a duration of 21 days. Within this period satisfactory assimilation of the sour milk product was evidenced without any side effects or meal rejection. A gain in weight for the period of treatment amounted to 300 g per child; physical condition of the children was improved; spewing lessened or terminated; fecal discharge normalized after 1 to 4 days of treatment; and a growth of bifidoflora to $10^8$–$10^9$ per 1 g of feces was in evidence.

In view of the foregoing, the proposed product can be used for feeding premature newborns and children suffering from intestinal infection.

Preparation of the proposed product does not require high-cost and scarce materials, or specially designed equipment.

DETAILED DESCRIPTION OF THE INVENTION

The method for obtaining the proposed sour milk product is sufficiently simple and employs any known suitable process techniques involving the following stages:

admission, cleaning and cooling of milk;
normalization of milk with cream;
homogenization of the thus obtained milk base with vegetable oil and fat-soluble vitamins;
preparation of carbohydrate ingredients (saccharose and malt extract);
mixing carbohydrate ingredients with the milk base;
sterilization or pasteurization of the mixture;
cooling the mixture to a souring temperature;
addition to the mixture of water-soluble vitamins and ferrous sulphate;
fermentation and souring of the mixture;
cooling of the finished product;
bottling, packing and labeling; and
storage.

The following examples are put forward hereinbelow for a better understanding of the present invention.

EXAMPLE 1

Added to 387 kg of 3.6% fat milk and 42.2 kg of 30% fat cream is 9 kg of corn oil; introduced preliminarily to this corn oil, depending on the concentration in the oil solution, are fat-soluble vitamins A, $D_2$ and E in the amounts 0.0005, 0.00001, and 0.0085 kg, respectively.

In order to provide a finely dispersed fat emulsion, the milk-fat base is homogenized at 15–20 MPa and mixed with solutions of carbohydrate ingredients. The solutions of carbohydrate ingredients are prepared simultaneously with the preparation of the milk base. Powdered sugar in the amount of 34.4 kg and 22.5 kg of malt extract having 74% of dry matter (corresponding to 17 kg of dry dextrin maltose) are dissolved in 406.9 kg of potable water heated to a temperature 48°±2° C., filtered through a coarse filter and mixed with the milk-fat base. The mixture is then pasteurized by exposing it to a temperature 95°±2° C. during 30 minutes and cooled to a temperature 44°±1° C.

Thereafter, added to the mixture are 100 kg of the ferments of pure cultures of bifidobacteria prepared on a sterile fat-free milk, 0.033 kg of ferrous sulphate and water-soluble vitamins (solutions in boiled and cooled water) C, PP, $B_1$, $B_2$, $B_3$, $B_6$ and $B_c$ in the amounts of 0.05, 0.004, 0.0003, 0.0001, 0.0015, 0.0002 and 0.00004 kg, respectively. All these ingredients are thoroughly stirred. The mixture is soured in special vessels for sour milk products at a temperature of 37°±1° C. to a coagulate acidity of 45±5° T, whereafter it is cooled and filled into 0.2 l glass bottles to be stopped and delivered for cool storage.

The product may be stored for up to five days at a temperature from 0° C. to 6° C.

The composition of the thus obtained product is as follows, in mass per cent:
milk fat: 2.6
vegetable fat: 0.9
saccharose: 3.4
dextrin maltose: 1.7
lactose: 2.0
ferrous sulphate: 0.0033
vitamins:
  A—0.00005
  $D_2$—0.000001
  E—0.00085
  C—0.005
  PP—0.0004
  $B_1$—0.00003
  $B_2$—0.00001
  $B_3$—0.00015
  $B_6$—0.00002
  $B_C$—0.000004
proteins: 1.7
bifidobacteria (ml): $10^9$
water: 87.7.

EXAMPLE 2

Added to 387 kg of 3.6% fat milk and 48 kg of 27.1% fat cream is 8 kg of deodorized sunflowerseed oil having preliminarily introduced thereto, depending on the concentration in the oil solution, fat-soluble vitamins A, $D_2$ and E in the amounts 0.0005, 0.00001 and 0.0084 kg, respectively.

For obtaining a finely dispersed fat emulsion the milk-fat base is homogenized at 15–20 MPa and mixed with solutions of carbohydrate ingredients. The solutions of carbohydrate ingredients are prepared simultaneously with the preparation of the milk base. Powdered sugar in the amount of 33 kg and 24 kg of malt extract having 78% of dry matter (corresponding to 18 kg of dry dextrin maltose) are dissolved in 400.0 kg of potable water warmed to a temperature 48°±2° C., filtered through a coarse filter and mixed with the milk-fat base. The mixture is pasteurized by exposing it to a temperature of 95°±2° C. during 30 minutes and cooled to a temperature of 44°±1° C. 100 kg of the ferment of pure cultures of bifidobacteria prepared on a sterile fat-free milk, 0.325 kg of ferrous sulphate, and water-soluble vitamins (solutions in boiled and cooled water) C, PP, $B_1$, $B_2$, $B_3$, $B_6$, and $B_c$ in the amounts 0.051, 0.004, 0.0003, 0.0001, 0.0015, 0.0002 and 0.00004 kg, respectively, are then introduced to the mixture. All these ingredients are thoroughly stirred. The mixture is soured in special vessels for sour milk products at a temperature of 37°±1° C. to an acidity of 45±5° T, whereafter it is cooled and filled into 0.2 l bottles to be stopped and delivered for cool storage. The product can be stored for up to 5 days at a temperature from 0° to 6° C.

The composition of the thus obtained product is as follows, in mass per cent:
milk fat: 2.7
vegetable fat: 0.8
saccharose: 3.3
dextrin maltose: 1.8
lactose: 2.1
ferrous sulphate: 0.00325
vitamins:
  A—0.00005
  $D_2$—0.000001
  E—0.00084
  C—0.0051
  PP—0.0004
  $B_1$—0.000025
  $B_2$—0.00001
  $B_3$—0.00015
  $B_6$—0.00002
  $B_c$—0.000004
proteins: 1.6
bifidobacteria (ml): $10^9$
water: 87.7.

EXAMPLE 3

Added to 383.1 kg of 3.6% fat milk and 40 kg of 27.55% fat cream is 10 kg of olive oil having preliminarily introduced thereto, depending on the concentration in the oil solution, fat-soluble vitamins A, $D_2$ and E in the amounts of 0.0005, 0.00001 and 0.008 kg, respectively.

For obtaining a finely dispersed fat emulsion the milk-fat base is homogenized at 15–20 MPa and mixed with solutions of carbohydrate ingredients. The solutions of carbohydrate ingredients are prepared simultaneously with the preparation of the milk base. Powdered sugar in the amount of 35 kg and 21.9 kg of malt extract having 74% of dry matter (corresponding to 16.2 kg of dry dextrin maltose) are dissolved in 410.0 kg of potable water warmed to 48°±2° C., filtered through a coarse filter and mixed with the milk-fat base. The mixture is pasteurized at 95°±2° C. during 30 mintues and cooled to 44°±1° C. 100 kg of the ferment of pure culture of bifidobacteria prepared on a sterile fat-free milk, 0.0335 kg of ferrous sulphate, and water-soluble vitamins (solutions in boiled and cooled water) C, PP, $B_1$, $B_2$, $B_3$, $B_6$ and $B_c$ in the amount of 0.049, 0.004, 0.0003, 0.0001, 0.0015, 0.0002 and 0.00004 kg, respectively, are then introduced to the mixture, and the mixture is thoroughly stirred. The mixture is soured in vessels for sour milk products at 37°±1° C. to an acidity of 45±5° T, whereafter it is cooled for bottling in 0.2 l bottles and cool storage where the obtained product can be stored for up to 5 days at a temperature of between 0° C. and 6° C.

The composition of the product is as follows, in mass per cent:
milk fat: 2.5
vegetable fat: 1.0
saccharose: 3.5
dextrin maltose: 1.6
lactose: 2.0
ferrous sulphate: 0.00335
vitamins:
  A—0.00005
  $D_2$—0.000001
  E—0.00084
  C—0.0049
  PP—0.0004
  $B_1$—0.000025
  $B_2$—0.00001
  $B_3$—0.00015
  $B_6$—0.00002
  $B_c$—0.000004
proteins: 1.8
bifidobacteria (ml): $10^8$
water: 86.6.

EXAMPLE 4

The product is obtained according to what has been described with reference to Example 1 to have a composition represented generally in Example 1, except that coconut oil is used as the vegetable fat.

The number of cells of bifidobacteria in the product is determined by inoculating the "Blaurock" medium with limit dilutions of the product.

What is claimed is:

1. A sour milk product consisting of proteins, milk and vegetable fats, lactose, dextrin maltose, saccharose, water, bifidobacteria, ferrous sulphate and vitamins A, $D_2$, E, C, $B_1$, $B_2$, $B_3$, $B_6$, $B_c$, PP with the following proportion of ingredients, in mass per cent:
   milk fat: 2.5–2.7
   vegetable fat: 0.8–1.0
   lactose: 2.0–2.2
   dextrin maltose: 1.6–1.8
   saccharose: 3.3–3.5
   ferrous sulphate: 0.00325–0.00335
   vitamins: 0.0064–0.0066
   proteins: 1.6–1.8
   bifidobacteria (ml): $10^8$–$10^9$
   water: the balance.

2. A sour milk product as claimed in claim 1 wherein the vegetable fat comprises a fat selected from the group consisting of corn, coconut, sunflower-seed and olive oils.

* * * * *